United States Patent [19]

Carter et al.

[11] Patent Number: 5,538,751

[45] Date of Patent: Jul. 23, 1996

[54] THICKENED FOODSTUFF HAVING IMPROVED STORAGE STABILITY AND PROCESS OF MAKING

[75] Inventors: Jeremy B. Carter, Bedford; Joanne M. Brown, Northampton; Rosalind C. Hodges, Bedford; Ingrid A. Appelqvist, Northampton; Charles R. Brown, Bedford; Isan T. Norton, Northampton, all of United Kingdom

[73] Assignee: Unilever Patent Holdings B.V., Vlaardingen, Netherlands

[21] Appl. No.: 332,970

[22] Filed: Nov. 1, 1994

Related U.S. Application Data

[63] Continuation-in-part of Ser. No. 59,026, May 6, 1993, abandoned, and a continuation of Ser. No. 227,420, Apr. 14, 1994, abandoned.

[30] Foreign Application Priority Data

May 8, 1992 [GB] United Kingdom ............... 9209997

[51] Int. Cl.$^6$ ............... A23L 1/0522; A23L 1/0524; A23L 1/053
[52] U.S. Cl. ............... 426/661; 426/573; 426/575; 426/578
[58] Field of Search ............... 426/573, 575, 426/578, 661

[56] References Cited

U.S. PATENT DOCUMENTS

| | | | |
|---|---|---|---|
| 2,442,658 | 6/1948 | Lloyd | 99/139 |
| 2,653,876 | 9/1953 | Hanson et al. | 99/182 |
| 3,554,764 | 1/1971 | Yoder et al. | 99/101 |
| 4,423,084 | 12/1983 | Trainor et al. | 426/589 |
| 4,428,972 | 1/1984 | Wurzburg et al. | 426/578 |
| 4,623,552 | 11/1986 | Rapp | 426/575 |
| 4,689,239 | 8/1987 | Rispoli et al. | 426/578 |
| 4,707,374 | 11/1987 | King et al. | 426/572 |
| 4,859,484 | 8/1989 | Bielskis et al. | 426/573 |
| 5,187,272 | 2/1993 | Katcher et al. | 536/102 |

FOREIGN PATENT DOCUMENTS

| | | |
|---|---|---|
| 900262 | 5/1972 | Canada. |
| 0076381A2 | 4/1983 | European Pat. Off.. |
| 0144453 | 6/1985 | European Pat. Off.. |
| 0216503 | 4/1987 | European Pat. Off.. |
| 0298561A2 | 1/1989 | European Pat. Off.. |
| 0342738A3 | 11/1989 | European Pat. Off.. |
| 2661317 | 10/1991 | France. |
| 1014105 | 12/1965 | United Kingdom. |
| 1220694 | 1/1971 | United Kingdom. |
| 1324557 | 7/1973 | United Kingdom. |
| 1562275 | 3/1980 | United Kingdom. |
| 2203160 | 10/1988 | United Kingdom. |
| 2225697 | 6/1990 | United Kingdom. |
| WO94/10859 | 5/1994 | WIPO. |
| WO94/14887 | 7/1994 | WIPO. |

OTHER PUBLICATIONS

Helen L. Hanson et al., Preparation of Stable Frozen Sauces and Gravies, Food Technology, Oct. 1951., pp. 432–440.

C. Ferrero, M. N. Martino and N. E. Zaritzky, "Stability of Frozen Starch Pastes: Effect of Freezing, Storage and Xanthan Gum Addition", *Journal of Food Process and Preservation*, Food & Nutrition Press, Inc., vol. 17, No. 3, 1993, pp. 191–210.

*Primary Examiner*—Helen Pratt
*Attorney, Agent, or Firm*—Eugene Zagarella, Jr.

[57] ABSTRACT

A thickened foodstuff having improved storage stability and retention of smoothness upon reheating which contains a non-pre-gelatinized amylose polymer containing component and a second biopolymer selected from the group consisting of a sheared amylopectin component, iota carrageenan, kappa carrageenan, xanthan, maltodextrins, pectins, alginates, agar, gum arabic, locust bean gum, guar gum, carboxymethyl cellulose, hydroxy propyl methyl cellulose, and mixtures thereof; with the amylose polymer containing component present as a dispersed phase.

14 Claims, No Drawings

THICKENED FOODSTUFF HAVING IMPROVED STORAGE STABILITY AND PROCESS OF MAKING

This application is a continuation-in-part of 08/059,026 filed May 6, 1993 and of 08/227,420 filed Apr. 14, 1994, both now abandoned, the contents of which are incorporated herein by reference.

FIELD OF THE INVENTION

The present invention relates to thickened foodstuffs with improved storage stability and having a smooth texture.

BACKGROUND TO THE INVENTION

Traditional thickened foodstuffs such as Chef Sauces, soups & gravies are based on starch as a thickening agent. Within the process of preparation, the sauce, soup or gravy is heated such that starch granules are swollen irreversibly and the amylose content of the starch granule is preferentially solubilized. In this way the granule birefringence and crystallinity disappear and a viscous paste is formed. The swollen starch granules, upon cooling, show a strong tendency to associate with each other. This phenomenon is called retrogradation. With traditional chef sauces, the sauce is used shortly after preparation and therefore the natural starches used cause no problem.

However, in manufactured foodstuffs the starch has to survive extremes in terms of processing (i.e. high temperatures and high shear) and then remain stable for long periods of storage time. Storage may be under frozen, chill or ambient conditions. The thickened foodstuff then needs to be stable on re-heating for consumption. The required product stability is not possible using traditional native starch thickened systems. Manufactured sauces have to date solved this problem by one of two solutions;

(a) The addition of gelatin to the native starch thickened foodstuff. This assists in limiting the extent of retrogradation damage. However, gelatin is expensive and comes from an animal source and is therefore unsuitable for vegetable/kosher foods. Furthermore the addition of gelatin does not enable the foodstuff to retain the desired viscosity when subjected to the required processing conditions (high temperatures and high shear).

(b) Use of chemically modified (cross-linked and derivatized) starches.

The use of such modified starches causes a number of problems and concerns such as;

(i) they give a starchy taste and texture, probably due to some (limited) retrogradation on storage (ii) they are seen by consumers as chemicals; and (iii) the final sauces are not as smooth a home-made sauces. This is probably due to limited swelling or retrogradation of the starch polymers.

It is therefore desirable to be able to replace modified starch thickening agents in foodstuffs.

DISCLOSURE OF THE INVENTION

Accordingly the invention provides a thickened foodstuff having improved storage stability and retention of smoothness upon reheating comprising a non-pre-gelatinized amylose polymer containing component and a second biopolymer selected from the group consisting of a sheared amylopectin component, iota carrageenan, kappa carrageenan, xanthan, maltodextrins, pectins, alginates, guar gum, agar, gum arabic, locust bean gum, carboxymethyl cellulose, hydroxymethyl cellulose and mixtures thereof; wherein the amylose polymer containing component is present as a dispersed phase.

We have found that such thickened foodstuffs have a surprisingly smooth and good texture after frozen, ambient or chill storage.

The reheated thickened foodstuffs of the invention retain their good textural properties, i.e. absence of lumpiness/sliminess and freeze-reheat stability, after dilution or drying.

Furthermore such thickened foodstuffs may be subjected to high temperature and or high shear process conditions without loss of product quality. The foodstuff may be thickened by the amylose polymer containing component and/or the second biopolymer. Advantageously the foodstuff is thickened by the second biopolymer because such a system further reduces the problems associated with use of native starches detailed above, i.e. the amylose polymer containing component provides the required mouthfeel characteristics alone.

Without wishing to be bound by theory, it is believed that the second biopolymer enables control of retrogradation damage by forming a continuous phase with the amylose polymer being present as discrete particles within this continuous phase and thus unable to form the network which results in the foodstuff having properties typically associated with retrogradation damage.

Preferably the second biopolymer is selected from the group consisting of a sheared amylopectin component, iota-carrageenan, kappa-carrageenan, pectins, maltodextrins, xanthan and mixtures thereof.

Most preferably the second biopolymer is selected from the group consisting of a sheared amylopectin component, pectins, maltodextrins and mixtures thereof.

Suitable maltodextrins are those having a dextrose equivalent (DE) value of 0.5 and 5. Preferred maltodextrins have a DE value of approximately 2.

By a sheared amylopectin component is meant an amylopectin component which has been obtained by:

(a) cooking an amylopectin component source in order to gelatinize the starch present; and (b) subjecting the cooked amylopectin component source to shear forces in order to solubilize the amylopectin component.

The amylopectin component source is a starch having a high amylopectin content, preferably a so-called waxy starch for example, waxy cereal starches, such as waxy maize starch, and waxy rice starch; waxy tuber starches; waxy fruit and legume starches; waxy root starches; mutant waxy starches; hybrid waxy starches; modified waxy starches (chemically and/or physically and/or enzymatically modified waxy starches. Examples of such starches are heat-moisture-treated starches, starches which have been reacted with a monofunctional reagent to introduce substituents such as phosphate, adipate, acetate, hydroxyalkyl or succinate groups) and mixtures thereof. The amylopectin component source can also be cereal or root starches, such as wheat or potato, from which the amylose has been separated or otherwise rendered unavailable to interact with the native starch component that is used to thicken the foodstuff.

The preferred waxy starches are waxy cereal starches, waxy root starches, mutant waxy starches and mixtures thereof. Even more preferred waxy starches are cereal starches such as waxy maize starch and waxy rice starch and mixtures thereof.

The sheared amylopectin component can give the benefit at a level of 1% dependent on the system, but usually a level of at least 2% by weight is required.

In order to obtain the required microstructure as defined (the amylose polymer containing component being present as a dispersed phase) a minimum concentration of the second biopolymer must be utilized. This minimum concentration will be readily determined by the skilled person, and is, for examples as follows;

Kappa-Carrageenan—0.5% by weight of the foodstuff
Agar, xanthan, guar gum, locust bean gum—0.2% by weight of the foodstuff.
Pectin & Alginate—0.75 to 1% by weight of the foodstuff
Maltodextrins—8–10% by weight of the foodstuff Iota Carrageenan—0.3% by weight of the foodstuff Carboxymethylcellulose & Hydroxypropyl Methyl Cellulose 0.5% by weight of the foodstuff.

The amylose polymer containing component of the thickened foodstuff may be obtained from any suitable source. Generally the amylose polymer containing component will be provided by a native starch, or a material comprising native starch such as flour. Suitable native starches are for example, corn or maize starch, tapioca starch, wheat starch, rice starch, barley starch, pea starch, grain sorghum starch, potato starch and mixtures thereof.

It is an essential feature of the invention that the amylose polymer containing component is not pre-gelatinized. By pre-gelatinized is meant that prior to the addition of the second biopolymer component the amylose polymer containing component has not been heated above its gelatinization temperature. It is thus essential that the amylose polymer containing component is only heated above its gelatinization temperature when in the presence of the second biopolymer.

The amylose polymer containing component will usually be present at a level up to about 10% by weight of the final product. Furthermore the amylose content of the amylose polymer containing component is preferably less than 30%, when the amylose polymer containing component is a native starch.

Examples of the thickened foodstuffs according to the present invention are gravies; soups; sauces; dressings, spreads, mayonnaise; and the like.

The thickened foodstuffs according to the present invention may further comprise one or more components selected from fats; fat substitutes or replacers; animal protein; plant protein; fungal protein; vegetables; herbs; spices; dairy material; egg material; acidifying agents; emulsifiers; flavoring agents; flavoring precursors; sweetening agents; coloring agents; salt; minerals; vitamins; antioxidants; stabilizers, and mixtures thereof.

The fat (which includes oils) may be of vegetable or animal origin and may be a synthetic fat. It may be a single fat or fat fraction or a mixture of fats and/or fat fractions. At least part of the fat may be replaced by a low-calorie fat substitute or fat replacer. Particularly suitable fat replacers are the edible polyesters of polyhydric alcohols having at least four free hydroxyl groups, such as polyglycerols, sugars or sugar alcohols, and saturated or unsaturated, straight or branched alkyl chain $C_8$–$C_{24}$ fatty acids. The polyhydric alcohol fatty acid polyesters include any such polyesters or their mixtures of which an average of at least 70% of the polyhydric alcohol hydroxyl groups have been esterified with the fatty acids. Fatty alkyl ether derivatives of glycerol, esters of $C_8$–$C_{24}$ fatty alcohols and polycarboxylic acids, waxes and microcrystalline cellulose can also be used for replacing or substituting at least part of the fat.

The animal protein may be the meat of mammals (such as beef, pork, lamb meat), poultry (such as chicken and turkey) and fish. Mixtures of meat may also be used.

The vegetable protein may be soyabean protein; the fungal protein can be myco-protein. Vegetables such as red peppers, onion may be used. The dairy material may be milk, cheese or yoghurt. The acidifying agents or acidulants may be innocuous acids such as acetic acid, citric acid, succinic acid, malic acid, vinegar or lemon juice. The stabilizers may be hydrocolloids and gums.

The emulsifiers are preferably selected from alkali metal or hydrogen $C_{12}$–$C_{24}$ fatty acid acyl lactylates, such as sodium stearoyl-2-lactylate; monoglycerides of, preferably saturated, $C_{12}$–$C_{14}$ fatty acids, such as glycerol monostearate; diacetyl tartaric acid esters of mono- and/or diglycerides of $C_{12-C24}$ fatty acids; succinylated monoglycerides of $C_{12}$–$C_{24}$ fatty acids, and mixtures thereof.

The invention additionally comprises a process for the preparation of a thickened foodstuff having improved storage stability and retention of smoothness upon reheating comprising a non-pre-gelatinized amylose polymer containing component and a second biopolymer, which process includes causing the amylose polymer containing component in solution to separate from a solution of the second biopolymer to form a dispersed phase.

The preparation process therefore comprises the steps of;

(i) preparation of a dispersion comprising the second biopolymer (ii) mixing the second biopolymer dispersion with the amylose polymer containing component, the temperature of the second biopolymer dispersion during mixing being below the gelatinization temperature of the amylose polymer containing component;

(iii) heating the mixture to a temperature of above the gelatinization temperature of the amylose polymer containing component for sufficient time to substantially gelatinize the amylose polymer containing component; and (iv) cooling the mixture as required and optionally freezing.

Preferably the dispersion of the second biopolymer described in step (i) is at a temperature of less than or equal to 55° C., most preferably from 40° to 55° C.

The amylose polymer containing component may be admixed to the second biopolymer dispersion either in powder form or as a dispersion. When the amylose polymer containing component is added as a dispersion, the dispersion is prepared at a temperature below the gelatinization temperature of the amylose polymer containing component, preferably at a temperature of less than or equal to 55° C., most preferably at a temperature of from 20° to 40° C.

Preferably the mixture formed in step (iii) is heated to from 55° C. to less than 160° C., most preferably from 85° C. to 100° C., even more preferably to approximately 95°.

The preparation process may optionally include the additional step of subjecting the mixture comprising the second biopolymer and the amylose polymer containing component to shear immediately prior to cooling the mixture as required.

Alternatively, the preparation process may optionally include the additional step of subjecting the second biopolymer to shear prior to admixing with the amylose polymer containing component.

The level of shear applied will vary according to both the second biopolymer used and its concentration. The amount of shear required to convert cooked amylopectin into sheared amylopectin is difficult to define precisely in that it depends on the concentration of cooked amylopectin used and the size of batch. Furthermore, since sheared amylopectin can be produced by a variety of shear regimes, it appears more meaningful to define the system in terms of the appearance and viscosity of the resultant product—i.e. that the shear input is sufficient to break down all cooked starch granule structure, as determined microscopically, and to thin the mix such that the apparent sliminess associated with the original cooked amylopectin disappears but without breaking the carbohydrate chains in the solubilized amylopectin. Typically this procedure reduces the viscosity of 10% cooked amylopectin (Amioca) to a maximum of 0.25 Pas and preferably to 0.09–0.15 Pas when measured at a shear rate of $50\ sec^{-1}$. However, the skilled man will readily be able to determine the appropriate level of shear to apply in each circumstance in order to achieve the required level of solubility of the second biopolymer.

Preferably the shear force is effected by homogenization, however, high-shear intensive mechanical mixing may alternatively be applied, such as milling in, for example, a colloid mill or by use of a scraped surface heat exchanger.

Preferably the amylose containing component is totally gelatinized by the heating step (iii).

Preferably the preparation process is conducted under conditions such that some of the starch granules retain their particulate nature. This provides particularly advantageous properties of taste and oral texture to the foodstuff.

EXAMPLES

Examples 1 to 13; Comparative Examples A to D

Examples of storage stable aqueous phases in which a natural German wheat starch is protected from freeze-thaw damage by the presence of a second biopolymer.

Example 1

A 1% Iota-carrageenan (X0908 90% i-carrageenan) solution was prepared by adding 5 g of powder to 500 cm$^3$ of a 0.4% NaCl solution, and heated up to 95° C. with continuous stirring until the biopolymer was completely dissolved. The solution was allowed to cool to 40° C. and 25 g of natural German wheat starch (5%) was added to the biopolymer solution with continual stirring. The mixture was heated to 95° C. and held at this temperature with gentle stirring for 10 minutes, until the starch was fully gelatinized. An aliquot of the mixture was bagged into a plastic sachet and placed in a −18° C. freezer for 48 hrs. This sample was then reheated by placing the sachet into a pan of water at 95° C. for 20 minutes. Light microscopy studies were carried out on both the fresh and freeze-thawed/reheated samples using a Leitz ortholux II Microscope fitted with a video camera JVC KY F30B and linked to a Sony 5200 UP video printer. Samples were placed on a glass slide and stained using 0.2% Grams Iodine solution. A coverslip was placed on top and excess iodine was removed from the edges using absorbent paper. The slides were placed on the holding stage of the microscope and were viewed with a X10 objective giving a total magnification of X160.

Example 2

A 1% solution of Kappa-carrageenan (X6960 90% k-carrageenan) was prepared as in Example 1. The rest of the procedure was the same.

Example 3

A 2% solution of DE 35 Pectin (X2918, Hercules—CPF) was prepared as in Example 1. The rest of the procedure was the same.

Example 4

A 2% solution of "Slendid" Pectin (DE 10, LM Pectin Ex. Hercules—CPF) was prepared as in Example 1. The rest of the procedure was the same.

Example 5

A 1% solution of Xanthan (Keltrol F, Kelco) was prepared by dissolving in deionized water instead of a 0.4% salt solution using the same procedure as in Example 1. The rest of the procedure was the same.

Example 6

A 1% solution of locust bean gum (Sanofi Bio-industries) was prepared as in Example 5. The rest of the procedure was as in Example 1.

Example 7

A 1% solution of guar gum was prepared as in Example 5. The rest of the procedure was as in Example 1.

Example 8

A 1% solution of Agar (Luxara 1253, Branwells, UK) was prepared as in Example 5. The rest of the procedure was the same as Example 1.

Example 9

A 1% solution of alginate (Manugel DMB, Kelco) was prepared as in Example 5. The rest of the procedure was the same as in Example 1.

Example 10

A 10% solution of Maltodextrin (DE2) (Paselli SA2, Avebe) was prepared as in Example 5. The rest of the procedure was the same as in Example 1.

Example 11

A 0.5% solution of Kappa-Carrageenan (x6960 90% k-Carrageenan) was prepared as in Example 1. The rest of the procedure was the same.

Example 12

A 1% solution of DE 35 pectin (x2918, Hercules-CPF) was prepared as in Example 1. The rest of the procedure was the same.

Example 13

A 0.2% solution of Xanthan (Keltrol F, Kelco) was prepared as in Example 1. The rest of the procedure was the same.

Comparative Example A

A 1% solution of Gellan was prepared as in Example 5. The rest of the procedure was the same as for Example 1.

Comparative Example B

A 0.25% solution of Kappa-Carrageenan (x6960 90% k-Carrageenan) was prepared as in Example 1. The rest of the procedure was the same.

Comparative Example C

A 0.1% solution of Xanthan (Keltrol F, Kelco) was prepared as in Example 1. The rest of the procedure was the same.

Comparative Example D

A 0.5% solution of DE35 Pectin (x2918, Hercules-CPF) was prepared as in Example 1. The rest of the procedure was the same.

RESULTS

Examples 1–13

Microscopy studies showed that the amylose polymer was present as discrete particles within the continuous phase comprising the second biopolymer. The discrete amylose polymers were retained on freezing and thawing.

Comparative Examples A to D

Microscopy studies showed that the amylose polymer was not present as discrete particles within the continuous phase comprising the second biopolymer. The compositions were not freeze-thaw stable.

Examples 14 to 15

Incorporating Kappa carrageenan or DE 35 Pectin as the second biopolymer and a natural wheat starch as the amylose component into a model oil-in-water emulsion to illustrate the advantages of the invention.

Example 14

Kappa carrageenan (1%) was dispersed in deionized water (73.0%) along with sodium chloride (0.4%) and sodium caseinate (0.5%), and heated to 95° C. with continuous stirring to solubilize the k-carrageenan and sodium caseinate. This solution was allowed to cool to 40° C. and then German wheat starch (3.5%) was added to the solution with stirring. The biopolymer/starch solution was heated to 95° C. and held at this temperature for 10 minutes with continuous stirring, until the starch was gelatinized. Sunflower oil (15%) was heated to 80° C. and the biopolymer/ starch solution (at 80° C.) was added to the oil. A Silverson Laboratory mixer with tubular attachment (2.45 cm od) was used at maximum speed setting to convert the crude oil-in-water emulsion into a fine o/w emulsion with typical emulsion appearance. The o/w model system was finally titrated with white wine vinegar to a final pH value of 5. Light microscopy studies were carried out on both fresh and freeze-thawed/reheated samples,as described in Example 1.

Example 15

2% DE 35 pectin and 3.5% German wheat starch were incorporated into the oil-in-water model emulsion and prepared as in example 19.

RESULTS

Microscopy studies showed that the amylose polymer was present as discrete particles within the continuous phase comprising the second biopolymer. The discrete amylose polymers were retained on freezing and thawing.

Example 16

A low fat mayonnaise was prepared to illustrate the advantages of the invention. The product involved natural wheat starch as the amylose component and iota carrageenan as the second biopolymer.

TABLE 1

| Ingredient | Composition % | g |
|---|---|---|
| Deionised water | 76.231 | 3811.556 |
| Sucrose | 9.000 | 450.000 |
| Sodium Chloride | 1.500 | 75.000 |
| Glacial Acetic Acid | 0.660 | 33.000 |
| German Wheat Starch | 5.000 | 250.000 |
| Sunflower Oil | 5.000 | 250.000 |
| Egg Yolk Powder | 0.400 | 20.000 |
| Mayonnaisegewurtz | 0.005 | 0.200 |
| Lemon Aroma | 0.005 | 0.250 |
| Dijon Mustard | 1.200 | 60.000 |
| Iota-Carrageenan (Hercules X-0908) | 1.000 | 50.000 |
| Total | 100.000 | 5000.000 |

A hot premix was prepared as shown in scheme 1. Deionized water was heated to 60° C. in a jacketed tank fitted with a slow speed paddle stirrer and iota carrageenan dissolved in it (Silverson mixer, 5 min.) followed by sucrose and sodium chloride (Silverson, 3 min, 60° C.). The solution was cooled to 40° and german wheat starch dispersed into it (Silverson, 3 min.). The dispersion was then heated to 95° C. for 3 to 5 minutes to effect gelatinization of the starch. After cooling to 80° C. the mixture was acidified to pH 3.7 and the flavors and oil added. The hot pre-mix was then cooled to 5° C. by processing through scraped surface heat exchanger and pin mixing units. The processing conditions are given in Table 2.

| Scheme 1: Pre-Mix Preparation | | |
|---|---|---|
| ACTION | TEMP (°C.) | OBSERVATION |
| DEIONISED WATER ↓ | >60 | |
| IOTA-CARRAGEENAN (Silverson, 5 min.) ↓ | >60 | Lumpy, Thick, Aerated |
| SUCROSE, SODIUM CHLORIDE (Silverson, 3–5 min.) ↓ | 60 | |
| COOL ↓ | 40 | |
| GERMAN WHEAT STARCH (Silverson, 3–5 min.) ↓ | 40 | White, V. Thick, Lumpy |
| COOK (Hand Stir, 3 min.) ↓ | 95 | Low Viscosity, Smooth |
| COOL ↓ | 80 | |
| ACIDIFY | | pH = 3.7 |

Scheme 1: Pre-Mix Preparation

| ACTION | TEMP (°C.) | OBSERVATION |
|---|---|---|
| ↓ | | |
| ADD FLAVOURS (Egg, Mayo>, Lemon, Mustard) | | |
| ↓ | | |
| ADD SUNFLOWER OIL | | |
| ↓ | | |
| RE-HEAT PRE-MIX | >85 | Very Smooth, creamy, Thick |
| ↓ | | |
| PROCESS TO DRESSING | 5 | Good Appearance, Very Smooth, Thick, Elastic, |
| ↓ | | |
| PACK AND STORE | 5 | High Opacity, Excellent Mouthfeel. |

TABLE 2

| | Processing Temperature (°C.) | |
|---|---|---|
| Unit Used | Set | Measured |
| Premix Jacket | >85 | 85.0 |
| A1 Jacket | −13 | −13.0 |
| C1 Jacket | −7 | −7.5 |
| A2 Jacket | 0 | 0.1 |
| A3 Jacket | 2 | 1.9 |
| A1 Inlet | | 55.0 |
| A1 Exit | | 17.6 |
| C1 Exit | | 6.0 |
| A2 Exit | | 5.8 |
| A3 Exit | | 4.9 |
| A1 Rotor Speed (rpm) | 3800 | 3800 |
| C1 Rotor Speed (rpm) | 4000 | 4000 |
| A2 Rotor Speed (rpm) | 1200 | 1200 |
| A3 Rotor Speed (rpm) | 1200 | 1200 |

The product was an excellent mayonnaise having a smooth, glossy appearance with a delicate pale yellow color of high opacity. The texture was smooth, thick and elastic with an excellent mouthfeel and breakdown properties.

Examination of the product by light microscopy revealed that amylose material was present as dispersed particulates. Freeze-Thaw stability was good as judged by having an unchanged microstructure and smooth texture after 60 hr. of frozen storage in a +60>−20>+60° C. temperature cycle.

Examples 17 & 18

Examples showing high shear stability

Example 17

Low methoxy pectin (DE35, X3953, Hercules Ltd) (10.0 g) was dispersed in deionized/distilled water (365.0 g) using the vortex of a Silverson Laboratory mixer fitted with tubular attachments (1.9 cm od). Sodium caseinate (2.5 g) and Duchi B Alt (5.0 g) was also added to the biopolymer solution then heated at 95° C. to allow caseinate and pectin to solubilize, with continuous stirring. The solution was cooled to 46° C. German Wheat starch (15.0 g) was added (as a slurry in 50.0 g water) to the pectin/caseinate solution and stirred to form a biopolymer/starch dispersion.

The dispersion was heated to 95° C. to allow the starch to gelatinize and was then added to a container of Sunflower Oil (75.0g) preheated to 80° C., with continuous mixing. Deionized water (15.0 g) was used to wash any gelatinized starch left in the biopolymer/starch container and the washings added to the container of sunflower oil.

A Silverson laboratory mixer was used to shear (Maximum rpm) the biopolymer/starch oil mixture for 3 minutes at 95° C. The model sauce so formed was cooled to 45° C. before the system was acidified from pH 6.5 to pH 5.5, using white wine vinegar (1.2 ml). Finally the sauce was sealed in 250 g sachets and frozen at 18° C.

Example 18

A sauce was prepared as in Example 25 but low methoxy pectin was replaced by Kappa-carrageenan (5.0 g).

RESULTS

The frozen sauces were prepared for microstructure examination, rheology testing and sensory evaluation by heating the frozen sachets in boiling water for 30 mins before removing and testing.

Starch was observed to be still granular and undamaged in form. The sauces were very smooth tasting.

Example 19

A white sauce was prepared from the formulation below by proportioning an aqueous and oil phase into a high speed C-Unit (crystallizer unit) with subsequent pH adjustment with addition on white wine vinegar.

| Sauce Formulation: | |
|---|---|
| Ingredient | Amount (% w/w on product) |
| Oil Phase | |
| Sunflower Oil | 15.0 |
| Aqueous Phase | |
| Iota carrageenan | 1.0 |
| Starch | 3.0 |
| Sodium Caseinate | 0.5 |
| Duchi B ALT flavour | 1.0 |
| Deionised water | 79.5 |
| White wine vinegar | to pH 5.5 |

Sunflower oil (Craigmillar, UK) containing 65% unsaturates, 11% saturates and a low level of cholesterol was heated to 60° C. in a stirred pre-mix tank.

Half the amount of deionized water was pre-heated to 60° C. in a pre-mix tank and iota-carrageenan dispersed into it using a Silverson mixer. Sodium Caseinate (Spray Bland, DMV, Holland) and remaining aqueous phase ingredients were dispersed in the remaining water at 60° C. using a Silverson. The two solutions were then combined in a pre-mix tank and cooled to 45° C. Natural starch was added and the dispersion heated at 95° C. (Jacket 104C) and maintained at this temperature with stirring for 30 mins.

After cooling the aqueous phase to 60° C. the oil and water phases were combined via a proportioning pump in a high speed crystallizer unit (C-Unit, no cooling) operated at 4000 rpm and with the oil phase being injected midway along the unit.

The emerging sauce was cooled to 60° C., mixed with white wine vinegar in a pre-mix stirred vessel until a pH of 5.5 was achieved and then packed into hermetically sealed vessels (Kilner jars or retortable pouches).

A smooth sauce was produced in which starch present in a partially swollen granular but undamaged form and which has a viscosity similar to a commercially produced white sauce.

Example 20; Comparative Examples E & F

These Examples illustrate that addition of the second biopolymer to a starch containing solution has no detrimental effect on the viscosity when the solution is subjected to temperature and shear conditions, whereas the addition of gelatin prevents the starch-containing solution from retaining its viscosity.

Example 20

Potato starch (Farina) (2.5 g) was added to a Rapid Visco-Analyzer (RVA) stirring pot. 22.5 g of a 1% iota-carrageenan solution in distilled water was added to the dry starch and mixed using the RVA paddle until the starch was homogenously dispersed and a smooth paste was formed. The RVA pot was placed into the RVA machine and a temperature-time profile set up (35° to 95° C. at a heat rate of 1.5° C./min). The temperature was then maintained at 95° C. for 5 min.

Comparative Example E

Example 20 was repeated except 22.5 g distilled water replaced the iota-carrageenan solution.

Comparative Example F

Example 20 was repeated except 22.5 g 4% gelatin solution in distilled water replaced the iota-carrageenan solution.

RESULTS

A much lower product viscosity was obtained with the starch/gelatin mixture than either starch alone or starch/second biopolymer mixture.

Example 21

2 parts "AMIOCA" (Trade mark for waxy maize starch ex National Starch) in 95.5 parts of water were cooked together in a saucepan for 15 minutes until the mix reached a temperature of 95° C. and then held at that temperature for 5 minutes. The mix was then sheared to a thin liquid, using a Silverson L4R mixer with an emulsor screen at full power, i.e. 0.25 kw input and 6,000 to 8,000 revolutions per minute for about 5 minutes. 2.5 parts of Cornflour were then added to the sheared Amioca dispersion and the mix heated to 90° C. in a bain marie and gently stirred for 5 minutes. The cooked mix was then poured into plastic sheets, cooled to −20° C. and held frozen for 48 hours. The sachet was then reheated to 80° C. in a pan of boiling water and examined.

The reheated dispersion was smooth and had no slimy appearance and texture.

Comparative Example G 2.5 parts of Cornflour were heated for 5 minutes in 97.5 parts of water at 90° C. in a bain marie with gentle stirring. The cooked starch was then poured into plastic sachets, cooled to −20° C. and held frozen for 48 hours. The sachet was then reheated to 80° C. in a pan of boiling water and examined.

The reheated dispersion was lumpy, containing small pieces of soft gel surrounded by a watery liquid.

Comparative Example H 2.5 parts of Cornflour and 2 parts of "AMIOCA" (Trade mark for waxy maize starch ex National Starch) were heated in 95.5 parts of water to 90° C. in a bain marie with gentle mixing and held at 90° C. for 5 mins. The cooked mix was then poured into plastic sachets, cooled to −20° C. and held frozen for 48 hours. The sachet was then reheated to 80° C. in a pan of boiling water and examined.

The reheated dispersion was smooth but had a slimy appearance and texture not noticed in Example 21.

Example 22

Example 21 was repeated except that this time the concentration of Cornflour was 5% and the concentration of "AMIOCA" (Trade mark for waxy maize starch ex National Starch) used was 4%.

After heating, freezing and reheating, the dispersion was smooth and without a slimy appearance and texture.

Comparative Example I

Comparative Example G was repeated with 5% Cornflour. After heating, freezing and reheating, the dispersion had severely retrograded into large jelly-like lumps surrounded by a watery liquid.

Comparative Example J

Comparative Example H was repeated with 5% Cornflour and 4% Amioca. After heating, freezing and reheating, the dispersion contained lumps and was surrounded by a slimy liquid.

Example 23 and Comparative Examples K & L

Experiments were conducted in a gravy mix having the following composition:

| COMPOSITION (wt %) | EXAMPLE | | |
|---|---|---|---|
| | 23 | K | L |
| Cornflour | 2.5 | 4.5 | 2.5 |
| "AMIOCA" | — | — | 2.0 |
| Sheared "AMIOCA" | 2.0* | — | — |
| Onion Powder | 0.2 | 0.2 | 0.2 |
| Caramel | 0.4 | 0.4 | 0.4 |
| Salt | 0.2 | 0.2 | 0.2 |
| Flavours | 2.5 | 2.5 | 2.5 |
| Beef Fat | 1.0 | 1.0 | 1.0 |
| Water | to 100 | to 100 | to 100 |

*added as 20 parts of 10% sheared amioca solution.

10% Sheared "AMIOCA" (trade mark) was prepared by heating 10 parts of "AMIOCA" in 90 parts of water to 95° C. in a saucepan and then shearing the cooked "AMIOCA" to a thin liquid with the Silverson (for 5–10 mins) according to the method described in Example 21.

The powdered ingredients were added to the water (or to the sheared "AMIOCA" dispersion in Mix 3), heated in a pan with gentle stirring until they started to boil and the beef fat added. They were then cooled to 60° C., adjusted for any water loss, frozen and reheated according to the method described in Example 21.

After reheating, the gravy of Example 23 was smooth and had a good texture, typical of a freshly prepared gravy.

After reheating, the gravy of Example K was lumpy and had retrograded into large jelly-like lumps surrounded by a watery liquid.

After reheating, the gravy of Example L was smooth but slimy.

Example 24 and Comparative Examples M & N

Experiments were conducted in a Cream Sauce mix having the following composition:

| COMPOSITION | EXAMPLE | | |
|---|---|---|---|
| | 24 | M | N |
| Wheat starch | 3.0 | 3.0 | 3.0 |
| "AMIOCA" | — | — | 2.0 |
| 10% Sheared "AMIOCA" | 20.0 | — | — |
| Unsalted Butter | 3.8 | 3.8 | 3.8 |
| Cream (35% fat) | 35.9 | 35.9 | 35.9 |
| Flavours | 2.6 | 2.6 | 2.6 |
| Onion Powder | 0.03 | 0.03 | 0.03 |
| Reduced White wine* | 4.5 | 4.5 | 4.5 |
| Salt | 0.4 | 0.4 | 0.4 |
| Water | to 100 | to 100 | to 100 |

*9 parts of white wine were reduced to half their original weight by boiling in a saucepan.

10% Sheared "AMIOCA" was prepared as in Example 23. The other starches were slurried in part of the water. The butter and the dry ingredients, excepting the starches, were combined with the rest of the water and warmed in a saucepan with gentle stirring until the fat had melted and the powders dispersed (at a temperature of 30–50° C.). To this was added the reduced wine, the starch slurries—and the sheared "AMIOCA" in Example 24—and the cream. The sauces were then heated for ca 10 mins with gentle stirring until they reached 95° C. The sauces were then cooled to 60° C., adjusted for any water loss, frozen and reheated according to the method described in Example 21.

Example 24

After reheating the cream sauce was smooth and had a good creamy texture, typical of a freshly prepared Cream Sauce.

Comparative Example M

After reheating, the sauce was lumpy with retrograded jelly-like lumps surrounded by a creamy liquid.

Comparative Example N

After reheating, the sauce was smooth but slimy.

Example 25 and Comparative Examples O & P

The gravies prepared in Example 23 were poured into cans, sealed and sterilized in a pressure cooker at 121° C. for 30 mins. The samples were then cooled, held at room temperature for 48 hours and then reheated to 80° C. in a saucepan of boiling water. The cans were then opened and the gravies examined.

Example 25: Sterilized Version OF Example 23

After reheating the gravy was smooth and had a good texture, typical of a fresh gravy.

Example O: Sterilized Version OF Example K

When the can was opened, the gravy appeared as a solid lump of jelly with a small amount of free liquid on the top.

Example P: Sterilized Version OF Example L

After reheating the gravy was smooth but slimy.

Example 26 and Comparative Sample O

This demonstrates the effect of subsequent dilution of frozen reheated wheatstarch cooked in sheared "AMIOCA". A concentrated cooked starch mix was prepared as follows; 10 parts of wheat starch were mixed with 40 parts of 10% Sheared "AMIOCA", prepared as in Example 23, and 50 parts of water and cooked to 90° C., frozen and reheated according to the method described in Example 21. The reheated mix was then diluted 4 times with water and refrozen.

The diluted mix, now containing 2.5% wheat starch and 1% Sheared "AMIOCA" remained smooth on reheat.

ComparativesAMPLE O

Comparative sample G was repeated with 10% wheat starch in place of 2.5 parts Cornflour. After heating, freezing and reheating, the dispersion was a solid lump which could not satisfactorily be diluted since it would not readily disperse in added water.

Example 27

This demonstrates the effect of drying wheat starch cooked in Sheared "AMIOCA". A 10% wheatstarch cooked in 4% sheared "AMIOCA" was prepared and frozen, as described in Example 26. The frozen mix was then freeze dried and the material ground to a powder by passing through an Apex hammermill with a 3 mm screen at ca 3000 rpm.

7 parts of this dried precooked starch were dispersed in 93 parts of water to yield a typical starch thickened paste which retained its smoothness without being slimy even when refrozen and reheated according to the methods described in Example 21.

Example 28

10 parts of "AMIOCA" in 90 parts of water were cooked and then sheared to a thin liquid according to the method described in Example 21. The mix was then freeze dried, ground to a powder through an Apex hammermill as described in Example 27. 5 parts of Cornflour were then cooked in 4 parts of the freeze dried powder reconstituted in 91 parts of water, frozen and reheated according to the method described in Example 21. After reheating, the dispersion was smooth and without a slimy appearance and texture, similar to Example 22.

Example 29

10 parts of "AMIOCA" in 90 parts of water were cooked according to the method described in Example 21 and then sheared to a thin liquid by passing at 50 kilos/hour through a Crepaco piston homogenizer set at 200 Bar pressure. 5 parts of cornflour were then cooked with 40 parts of this 10% Sheared "AMIOCA" and 55 parts of water, frozen and reheated according to the method described in Example 21. After reheating the dispersion was smooth and without a slimy appearance and texture, being very similar to Example 22.

Example 30

Example 22 was repeated except that this time the sheared "AMIOCA" was replaced by 2.5% sheared Remyrise (waxy rice starch ex Remy) prepared in the same way as the sheared Amioca described in Example 21. After heating, freezing and reheat the dispersion was smooth and without a slimy appearance and texture.

Example 31

Example 21 was repeated except that this time the Sheared "AMIOCA" was replaced by 8% Sheared Wheat starch, again prepared in the same way as the Sheared "AMIOCA" described in Example 21. After heating, freezing and reheat the dispersion was thick, smooth and without a slimy appearance and texture.

We claim:

1. A thickened foodstuff having improved stability and retention of smoothness upon reheating comprising a non-pre-gelatinized amylose polymer containing component and an effective amount of a biopolymer to disperse the amylose polymer component, said bipolymer selected from the group consisting of a sheared amylopectin component, iota carrageenan, kappa carrageenan, xanthan, maltodextrins, pectins, alginates, agar, gum arabic, locust bean gum, guar gum, carboxymethyl cellulose, hydroxypropyl methyl cellulose, and mixtures thereof; wherein the amylose polymer containing component is present as a dispersed phase.

2. A thickened foodstuff according to claim 1 wherein the biopolymer is selected from the group consisting of a sheared amylopectin component, iota carrageenan, kappa carrageenan, pectins, maltodextrins, xanthan, and mixtures thereof.

3. The thickened foodstuff of claim 1 wherein the biopolymer is used in one of the following amounts:
   a) at least 1% by weight of sheared amylopectin,
   b) at least 0.3% by weight of iota carrageenan,
   c) at least 0.5% by weight of kappa carrageenan, carboxymethyl cellulose or hydroxypropyl methyl cellulose,
   d) at least 0.2% by weight of xanthan, agar, guar gum, gum arabic or locust bean gum,
   e) at least 0.75% by weight of pectins or alginates, or
   f) at least 8% by weight of maltodextrins.

4. A process for preparation of a thickened foodstuff having improved storage stability and retention of smoothness upon reheating comprising:
   (i) preparation of a dispersion comprising a biopolymer selected from the group consisting of a sheared amylopectin component, iota carrageenan, kappa carrageenan, xanthan, maltodextrins, pectins, alginates, agar, gum arabic, locust bean gum, guar gum, carboxymethyl cellulose, hydroxypropyl methyl cellulose and mixtures thereof;
   (ii) mixing an effective amount of the biopolymer dispersion with an amylose polymer containing component to disperse the amylose component and form a mixture, the temperature of the biopolymer dispersion during mixing being below the gelatinization temperature of the amylose polymer containing component;
   (iii) heating the mixture to a temperature of above the gelatinization temperature of the amylose polymer containing component; and
   (iv) cooling the mixture.

5. A process according to claim 4 wherein the dispersion of the biopolymer described in step (i) is at a temperature of from 40° to 55° C.

6. A process according to claim 4 wherein in step (ii), the amylose polymer containing component is mixed to mixed with the biopolymer dispersion as a dispersion having a temperature below the gelatinization temperature of the amylose polymer containing component.

7. A process according to claim 6 wherein the dispersion of the amylose polymer containing component is at a temperature of from 20° to 40° C.

8. A process according to claim 4 wherein in step (iii) the mixture is heated to from 55° C. to less than 160° C.

9. A process according to claim 4 wherein in step (iii) the mixture is heated to from 85° C. to 100° C.

10. A process according to claim 4 additionally comprising subjecting the biopolymer and amylose polymer containing component mixture to shear immediately prior to cooling the mixture.

11. The process of claim 10 wherein the mixture is cooled to freezing.

12. A process according to claim 4 wherein the amylose polymer containing component is totally gelatinized by heating in step (iii).

13. The process of claim 4 wherein in step (iv) the mixture is cooled to freezing.

14. The process of claim 4 wherein the biopolymer is used in one of the following amounts:
   a) at least 1% by weight of sheared amylopectin,
   b) at least 0.3% by weight of iota carrageenan,
   c) at least 0.5% by weight of kappa carrageenan, carboxymethyl cellulose or hydroxypropyl methyl cellulose,
   d) at least 0.2% by weight of xanthan, agar, guar gum, gum arabic or locust bean gum,
   f) at least 8% by weight of maltodextrins.

* * * * *